United States Patent
Yin et al.

(10) Patent No.: US 9,400,918 B2
(45) Date of Patent: *Jul. 26, 2016

(54) COMPACT FACE REPRESENTATION

(71) Applicant: Beijing Kuangshi Technology Co., Ltd., Beijing (CN)

(72) Inventors: Qi Yin, Beijing (CN); Zhimin Cao, Beijing (CN); Yuning Jiang, Beijing (CN); Haoqiang Fan, Beijing (CN)

(73) Assignee: Beijing Kuangshi Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/375,668

(22) PCT Filed: May 29, 2014

(86) PCT No.: PCT/CN2014/078815
§ 371 (c)(1),
(2) Date: Jul. 30, 2014

(87) PCT Pub. No.: WO2015/180101
PCT Pub. Date: Dec. 3, 2015

(65) Prior Publication Data
US 2015/0347819 A1    Dec. 3, 2015

(51) Int. Cl.
*G06K 9/00* (2006.01)
*G06K 9/46* (2006.01)
*G06K 9/66* (2006.01)

(52) U.S. Cl.
CPC ........ *G06K 9/00221* (2013.01); *G06K 9/00288* (2013.01); *G06K 9/66* (2013.01)

(58) Field of Classification Search
CPC . G06K 9/00221; G06K 9/66; G06K 9/00228; G06K 9/00288; G06K 9/00281; G06K 9/00248
USPC ......... 382/118, 170, 159, 190, 168, 254, 156, 382/263, 181, 103, 155
See application file for complete search history.

(56) References Cited

U.S. PATENT DOCUMENTS

| | | | | |
|---|---|---|---|---|
| 5,774,129 A * | 6/1998 | Poggio | ................... | G06T 11/00 345/441 |
| 6,038,337 A * | 3/2000 | Lawrence | ............ | G06K 9/4628 382/155 |
| 7,949,186 B2 * | 5/2011 | Grauman | ............. | G06K 9/4671 382/159 |
| 8,861,881 B2 * | 10/2014 | Tate | ........................ | G06T 5/003 345/473 |
| 8,873,813 B2 * | 10/2014 | Tadayon | .................. | G06K 9/00 382/118 |
| 9,117,111 B2 * | 8/2015 | Mori | .................. | G06K 9/00281 |
| 9,129,148 B1 * | 9/2015 | Li | ..................... | G06K 9/00268 |

* cited by examiner

*Primary Examiner* — Sheela C Chawan
(74) *Attorney, Agent, or Firm* — Fenwick & West LLP (57) ABSTRACT

A deep learning framework jointly optimizes the compactness and discriminative ability of face representations. The compact representation can be as compact as 32 bits and still produce highly discriminative performance. In another aspect, based on the extreme compactness, traditional face analysis tasks (e.g. gender analysis) can be effectively solved by a Look-Up-Table approach given a large-scale face data set.

18 Claims, 6 Drawing Sheets

COMPACT FACE REPRESENTATION

FIELD OF THE INVENTION

This invention relates generally to image processing and, more particularly, to face recognition and representation of faces using machine learning.

DESCRIPTION OF THE RELATED ART

Face recognition systems perform image processing on digital images or video frames to automatically identify people. Face recognition systems typically represent face images as feature vectors of very large dimension. After obtaining the representation, various algorithms can be applied to perform the task of classification, verification and/or searching. Performance of the algorithms depends heavily on the choice of representation. Recently, there has been interest in designing better representations based on prior knowledge of face images.

Hand-crafted representations of very large dimension may provide high accuracy of face recognition results. However, to perform face recognition with hand-crafted representations, complicated multi-stage systems are carefully optimized separately for each module. The multi-stage system typically includes modules for pre-processing, low-level encoding, feature transformation and higher level representation, for example. The hand-crafted tuning of each individual module is labor-intensive.

In addition, these representations are typically very large dimension. Traditionally, a face representation using thousands of dimensions is considered as "compact." Some dimension reduction or quantization methods may be adopted to compress the representation dimension for the applications of large-scale face recognition systems. However, the discriminative ability is usually decreased due to the compactness requirement. As a result, existing methods make different tradeoffs between compactness and discriminative ability.

Thus, there is a need for better methods for learning compact representations of faces for face recognition and other purposes.

SUMMARY

The present invention overcomes the limitations of the prior art by optimizing compactness and discriminative ability together, rather than separately of sequentially.

In one aspect, a method for training a deep learning neural network for compact face representations includes the following steps. Face images are presented to the neural network. The neural network processes the face images to produce compact representations of the face images. The compact representations are processed to produce estimates of a metric, for which the actual values are known. The neural network is trained based on the estimates of the metric compared to the actual values of the metric. In one implementation, the neural network is a pyramid convolutional neural network (pyramid CNN).

The compactness can be enforced in a number of different ways. For example, the compact representations may be constrained to have a predetermined number of dimensions, a total number of bits and/or a certain level of quantization for each dimension. A 32-bit compact representation could be 32 dimensions of 1 bit each, 4 dimensions of 8 bits each or 1 dimension of 32 bits.

Training the neural network in the face of quantization can be problematic since quantization does not provide well-behaved gradients. In one approach, the quantization is modeled as a rounding error and the neural network is then trained using this model. In another approach, quantization is modeled as random variables and dynamic programming is used to compute an expected value based on the random variables. In yet another approach, the neural network is trained based on an objective function that includes a standard deviation term.

In another aspect, compact face representations can be used in different ways. For example, a 32-bit face representation subdivides the entire space of all faces into $2^{32}$ subspaces. If the object is face recognition, the 32-bit representation can be used to prioritize which of the subspaces should be searched first. As another example, if the object is face classification (e.g., is this face male or female), the compact face representation may be used as an index to a lookup table.

Other aspects include components, devices, systems, improvements, methods, processes, applications and other technologies related to the foregoing.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Face Recognition Overview

Figure 1:
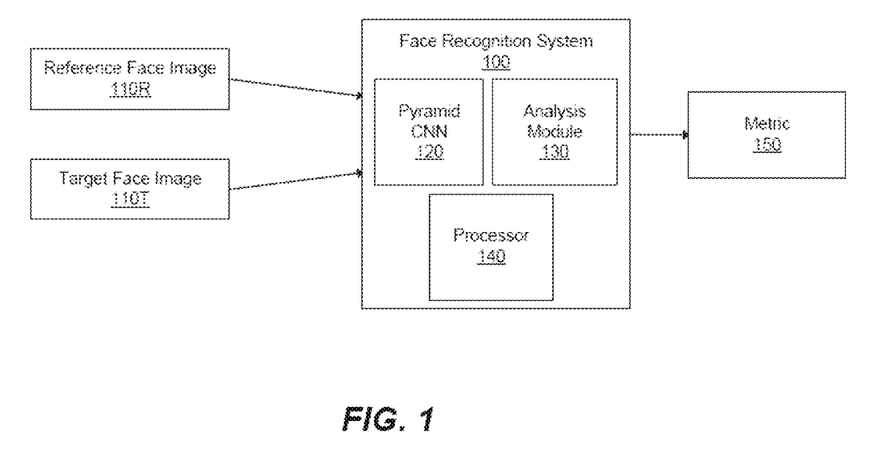
FIG. 1 is a simplified diagram of a face recognition system.

FIG. 1 is a simplified diagram of a face recognition system 100, according to one embodiment. The face recognition system 100 receives a target face image 110T and tries to recognize the face (i.e., associate the face with a specific individual) or perform other discrimination tasks on the face.

The face recognition system 100 also receives a reference face image 110R for a known individual. The face recognition system 100 performs analysis to generate a metric 150 to indicate whether the individual in the target face image 110T is the same as the individual in the reference face image 110R. The face recognition system 100 may have a large database of reference face images 110R for different individual and may compare the target face image 110T to many different reference face images 110R in order to identify the individual for the target face image 110T.

The face recognition system 100 in this particular example includes pyramid CNN 120, an analysis module 130, and a processor 140, although other implementations of a face recognition system 100 may use other components. For example, other types of neural networks or face coding engines can be used instead of the pyramid CNN. Each of these components may be embodied as hardware, software, firmware, or a combination thereof. Together, these components perform face recognition and determine whether the subjects in two face images 110 are identical or not.

The pyramid CNN 120 receives the face images 110 as inputs and generates a representation for each of the face images. Alternatively, the representations of the reference face images may be pre-computed. The representation of a face image preferably is obtained in an identity-preserving (ID-preserving) manner such that the distance in the mapped space closely reflects the semantic distance of identity of the face image to minimize the influence of irrelevant factors (e.g., illumination, expression, and pose).

Moreover, the representation preferably encodes abstract and high level information of identity of the face image in a compact space. That is, the face representation preferably can be encoded using not many bits. This typically means that the face representation has low dimensions and is quantized. For example, if the face representation is to be stored as an INT32, then there are 32 total bits available for the face representation. It could be an 8-dimensional representation where each dimension is quantized to 4 bits, or it could be a 32-dimensional representation where each dimension is a single bit. Other combinations will be apparent. Traditional approaches typically use face representations that are larger than 1K bytes, while the pyramid CNN can maintain good face discrimination using face representations of 4 to 64 bytes and preferably not more than 64 dimensions.

The analysis module 130 determines whether a subject in the reference face image 110R and a subject in the target face image 110T match. The analysis module 130 obtains the representations of the face images 110 at an output of the pyramid CNN 120. Further, the analysis module 130 generates metric 150 on whether the face images 110 belong to the same subject (person) based on the representations of the face images 110. The metric 150 can be used to perform face recognition. Typical metrics are based on computing the cosine angle between the two vector representations, or computing the Euclidean (or other) distances between the two representations.

The processor 140 executes instructions to perform face recognition on the face recognition system 100. The processor 140 receives instructions from memory (not shown), or external circuitry. The instructions may also reside, completely or at least partially, within the processor 140 (e.g., within a processor's cache memory). According to the instructions, the processor 140 transforms or selects a portion of the face images 110 to provide to the pyramid CNN 120. In addition, the processor 140 operates the pyramid CNN 120 and the analysis module 130 according to the instructions to perform core functions of the face recognition.

Face Representation

The pyramid CNN 120 is trained according to supervised learning signals to obtain a compact and distinctive representation. That is, the training simultaneously optimizes the compactness aspect and the discrimination aspect. In many traditional face recognition systems, the system may be trained first to discriminate but using a large dimension face representation. In a second step, the large dimension face representation is reduced in dimension. However, separating the training for discrimination and the compactness requirement may lead to sub-optimal results. It is preferable to train the face recognition system while simultaneously taking into account both the compactness and discrimination requirements.

The representation produced by the pyramid CNN can be expressed as a function map from image pixel to numeric vector.

$$f: R^{h \times w} \to R^m \quad (1)$$

In training the pyramid CNN 120, the desired representation is learned from a training set of pairs of face images 110. This involves parameterizing a function family and using an object function L to choose the representation extractor:

$$\theta_0 = \underset{\theta}{\arg\min}\, L(f_\theta, I_{data}) \quad (2)$$

where $f_\theta$ is the function implemented by the pyramid CNN when using weights $\theta$, $I_{data}$ is the training set, L( ) is an object function, and $\theta_0$ are the weights that optimize the object function L. The underlying function family f should contain enough complexity to express the complex and high-level computation required. To enforce the ID-preserving property, identity information should be used in the objective function L. This leads to a supervised representation learning method which is in contrast to the unsupervised methods that aim at modeling the density distribution of data points. Though unsupervised methods are capable of discovering the patterns emerged in data, their optimization target is not directly related to the recognition task, and so the learned representation obtained by the unsupervised method is inevitably susceptible to factors including illumination, expression and pose. In contrast, the supervised method explicitly imposes the ID-preserving requirement. Therefore, the learning representation obtained by the supervised method is immune to illumination, expression and pose.

In one embodiment, the supervised signal in face recognition labels face image pairs with an indication of whether they belong to the same person. One output neural network uses a distance function to compare the representations of pairs of face images and predicts whether the face image pair belongs to the same person. An example loss function is $$L = \sum_{I_1, I_2} \log(1 + \exp(\delta(I_1, I_2) D(I_1, I_2))) \quad (3)$$

$$D(I_1, I_2) = \alpha \cdot d(f_\theta(I_1), f_\theta(I_2)) - \beta \quad (4)$$

where $\delta(I_1, I_2)$ is a metric that indicates whether the two face images $I_1$ and $I_2$ of a pair belong to the same person. $f_\theta$ represents the computation done by the neural network to transform the face image to a representation, and d is a function to measure the distance between the representation vectors for the two face images. A common function d=|$f_\theta(I_1)$−

$f_\theta(I_2)|$. $\theta$ are the weights in the network, which are trained. $\alpha$ and $\beta$ are additional trainable parameters.

This loss function encourages small distances between features belonging to the same person (or subject) and penalizes similarity between unmatched pairs. Hence, a distance between the representations of the two face images in a pair is used as a metric to determine whether two face images of each pair are for the same person. When the two face images 110 are for the same person, the distance should be lower. When the two face images 110 are not for the same person, the distance should be higher. In this way, the learned feature manifests good ID-preserving property, and it is highly specific to the recognition task. Factors corresponding to intra-person variation will be suppressed by the network.

The above approach trains discrimination but does not enforce compactness. Compactness can be thought of as a combination of low dimensions and quantization (or discreteness). The low-dimension constraint is enforced by setting the model's output dimension m in Eqn. (1) to a small enough number. A 32-bit representation can be achieved by setting m=32 with each of the 32 dimensions quantized to a single bit. Smaller m can also be chosen, so that more bits can be assigned to each dimension. For example, setting m=8 with each of the 8 dimensions quantized to four bits also produces a 32-bit representation. Not all dimensions must be quantized to the same number of bits. Using more than one bit has the advantage of forming a hierarchical structure in the feature space so that the data points can be indexed at different levels of granularity. However, some applications explicitly demand binary representation.

Another constraint is discreteness, which means each dimension of the model's output is rounded:

$$f(x) = \lfloor 2^Q f_{model}(x) \rfloor, \qquad (5)$$

where Q corresponds to the number of bits available for encoding one dimension, $f_{model}(x) \in [0,1)^m$ is the m-dimensional representation using continuous variables, $\lfloor \rfloor$ is the floor function (a type of rounding operator), and f(x) is the quantized m-dimensional representation.

However, the non-differentiable rounding operator poses problem to gradient-based learning algorithms. This obstacle can be overcome using different techniques, including the ones described below.

One technique is referred to as the "rounding error term" technique. In this technique, a "noise" term $\gamma(x)$ is introduced to model the error brought by rounding:

$$f(x) = 2^Q f_{model}(x) + \gamma(x) \qquad (6)$$

Where $\gamma(x)$ corresponds to the residual. When computing the gradient of the loss function with respect to model parameters, this term is treated as a constant.

The technique works well for non-binary cases. The next two techniques are specialized to handle the binary case.

The first of the specialized techniques associates the model's real valued output with a random m-bit variable. The ith bit of f(x) has a probability of $f_{model}(x)_i$ to be 1 and $1-f_{model}(x)_i$ probability to be 0. The bits are independent. Then take the expectation of the loss function:

$$L' = E[L] = \sum_{I_1, I_2} E[\log(1 + \exp(\delta(I_1, I_2) D(I_1, I_2)))] \qquad (7)$$

where the expectation is taken over the random choices of $f(I_1)$ and $f(I_2)$. Then, L' is differentiable with respect to the model's output. The expectation can be efficiently computed by dynamic programming, so this technique will also be referred to as the "dynamic programming" technique. For $I_1$ and $I_2$, let $P_{i,j}$ be the probability that $f(I_1)$ and $f(I_2)$ differs at j bits in their first i bits. This yields $$P_{i,j} = (1 - p_1 - p_2 + 2p_1 p_2) D_{i-1,j} + (p_1 + p_2 - 2p_1 p_2) D_{i-1,j-1}. \qquad (8)$$

where $p_1 = f(I_1)_i$ and $p_2 = f(I_2)_i$. The boundary conditions are $P_{0,0} = 1$ and $P_{i,-1} = 0$.

Another technique aims at minimizing the error introduced by rounding. The idea is to encourage the model to output binarized values by adding a standard deviation term:

$$L' = L + w \sum_i Std(f(I)_i), \qquad (9)$$

where Std(•) denotes the standard deviation across the training set. This technique will be referred to as the "standard deviation" technique.

The framework is jointly optimized in the sense that both the requirements of compactness and discriminative power are tightly incorporated into the framework. This is in contrast to other methods which use hashing or dimensionality reduction algorithms as a post-processing step.

Pyramid Convolutional Neural Network (Pyramid CNN)

Figure 2:
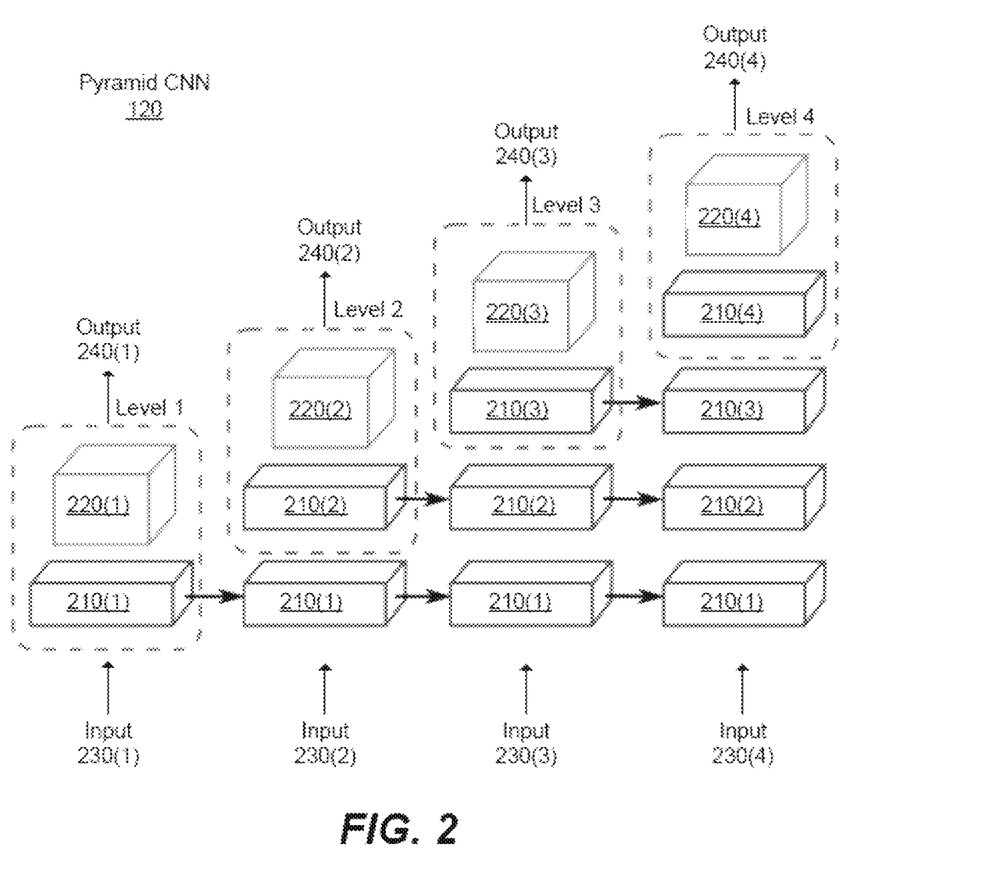
FIG. 2 is a diagram of a process of training a pyramid convolutional neural network (CNN).

FIG. 2 is a diagram of a process of training the pyramid CNN 120, according to one embodiment. The pyramid CNN 120 may directly receive face images (or portions of face images) 110 without any processing. Alternatively, the pyramid CNN 120 may receive processed face images (or portions of face images) 110. The pyramid CNN 120 includes N levels of convolutional neural networks. In this example, N=4 and the different CNN levels are labeled "Level 1" to "Level 4." Each neural network performs convolution, non-linearity and down-sampling. Different CNN levels typically have different depth and input size, and the different CNN levels also share layers (labeled 210 in FIG. 2). The pyramid CNN 120 generates a representation of each of the face images 110, and adapts neural networks based on the representation of each of face images 110.

The pyramid CNN 120 includes N shared layers 210 where N≥2 and at least one unshared network 220 coupled to the Nth shared layer. The pyramid CNN 120 includes N number of CNN levels. Each CNN level n (n=1 to N) includes an input, n of the shared layers, an unshared network, and an output.

For example, the pyramid CNN 120 illustrated in FIG. 2 includes four levels. Thus, the pyramid CNN 120 in this example includes four shared layers 210(1), 210(2), 210(3), and 210(4), unshared networks 220(1), 220(2), 220(3), and 220(4), inputs 230(1), 230(2), 230(3), and 230(4), and outputs 240(1), 240(2), 240(3), and 240(4).

CNN Level 1 includes only a single shared layer 210(1). The input 230(1) is coupled to the first shared layer 210(1), which is coupled to the unshared network 220(1), which is coupled to the output 240(1). In contrast, CNN Level 4 includes four shared layers 210(1)-(4). The input 230(4) is coupled to the first shared layer 210(1), which is coupled eventually to the last shared layer 210(4), which is coupled to the unshared network 220(4), which is coupled to the output 240(4). In general, for CNN Level n, the input 230(n) is coupled to the first shared layer 210(1), which is coupled eventually to the nth shared layer 210(n), which is coupled to the unshared network 220(n), which is coupled to the output 240(n). Note that shared layer 210(1) has the same structure and weights for all CNN Levels, as is true for each of the shared layers 210(n). The unshared networks 220 have the same structure for all CNN Levels but may have different weights for each CNN Level.

In operation (i.e., when not training), face images are input to input 230(4), processed by shared layers 210(1)-(4) and unshared network 220(4), and the last layer output 240(4) produces the compact representation of the face image.

In one embodiment, the pyramid CNN 120 is trained in a supervised greedy manner. As illustrated in FIG. 2, the dashed outline indicates which layers are trained at which CNN Level. The shared layer 210(1) and the unshared network 220(1) are trained together for CNN Level 1. The shared layer 210(2) and the unshared network 220(2) are trained together for CNN Level 2. Shared layer 210(1) is not trained for CNN Level 2. Rather, it takes the weights resulting from the training for CNN Level 1.

Each shared layer 210 includes convolution, down-sampling and non-linearity. Assume that CNN Level 1 is trained on 32×32 face images and further assume that each shared layer 210 includes a 2× down-sampling. This means that, CNN Level 1 receives 32×32 face images and the shared layer 210(1) is trained based on incoming 32×32 images. However, CNN Level 2 receives 64×64 face images, but the shared layer 210(2) is trained based on incoming 32×32 images/features generated by shared layer 210(1) due to the down-sampling. That is, the shared layer 210(2) and the unshared network 220(2) are trained together on the processed image/features from the first shared layer 210(1). And so on for other CNN Levels and shared layers. In this way, the size of the images/features used to train each shared layer 210(n) does not become prohibitively large as the total number of shared layers increases. The inputs to each CNN Level can be taken from the same set of images. For example, 32×32 clips can be used as inputs to CNN Level 1, 64×64 clips as inputs to CNN Level 2, and so on.

For each increasing CNN Level n, similar steps are performed, where the first (n−1) shared layers 210(1) ... 210(n−1) are fixed. The nth shared layer 210(n) and the nth=shared network 220(n) are trained together based on the processed images/features from the cascade of shared layers 210(1) ... 210(n−1). For example, in level 3, the shared layers 210(1), and 210(2) are not adapted, and the shared layer 210(3) and the unshared network 220(3) are trained together. Similarly, in level 4, the shared layers 210(1), 210(2), and 210(3) are not adapted, and the shared layer 210(4) and the unshared network 220(4) are trained together. In one embodiment, the size of the input 230(n) to CNN Level n increases as n increases from 1 to N, according to the down-sampling from the shared layers 210(1) ..., 210(n−1). Therefore, a size of the images/features input to the nth shared layer 210 is approximately constant for n=1 to N.

Table 1 shows one approach in supervised training of the pyramid CNN, as explained with respect to FIG. 2.

---
Algorithm 1 Supervised Greedy Training of the Pyramid CNN.

Input: the image data $I_{data}$
for l from 0 to $l_{max}$ do
   set $I_{train}$ to patches cropped from $I_{data}$
   let the CNN be $f_\theta(x) = f_\theta(f_\theta^1(x))$, where $f^1$ is the first layer's computation.
   find $\theta$ by minimizing the objective $^{(1)}$with $I_{data}$
   process the image data $I_{data} \leftarrow f_\theta^1 (I_{data})$
end for
---

Figure 3:
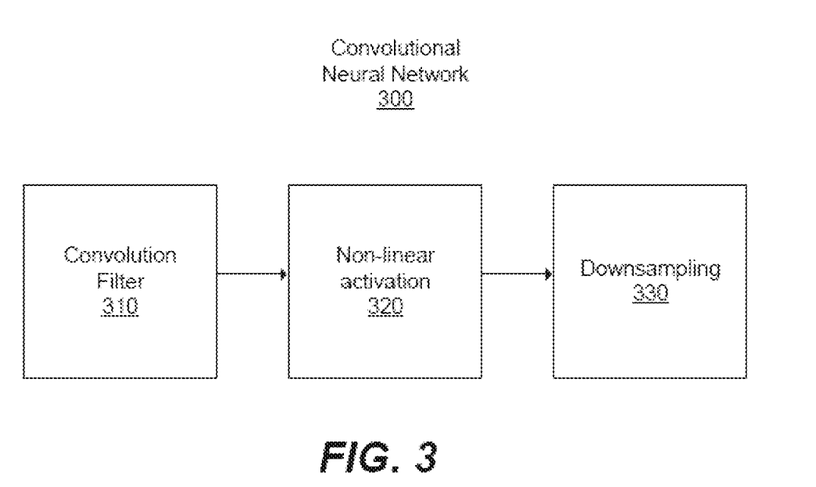
FIG. 3 is a detailed diagram of a convolutional neural network.

FIG. 3 illustrates one embodiment of a convolutional neural network layer 300. The convolutional neural network layer 300 may be used for the shared layers 210 and/or for the unshared networks 220. The convolutional neural network 300 includes a convolution filter 310, a non-linear activation operator 320, and a down-sampling operator 330.

The convolutional neural network layer 300 is a highly non-linear real valued multivariate function which is composed of the convolution filter 310, the non-linear activation operator 320 and the down-sampling operator 330:

$$I^{i+1} = P_{max}(g(I^i \otimes W^i + B^i)) \quad (10)$$

where $I^i$ is the neuron's value in the ith layer. The convolution filter 310 can be defined as:

$$(I^i \otimes W^i)_{x,y,z} = \sum_{a,b,c,z} I^i_{x-a,y-b,c} W^i_{a,b,c,z} \quad (11)$$

where W are the weights of the convolution filter and B (in Eqn. (5)) is a convolution filter bias. Both W and B are adapted during training. The non-linear activation operator 320 is represented by the non-linear function g. Examples of function B include the hyper-tangent function, rectified-linear function, sigmoid function, etc. The down-sampling can be defined as the max-pooling operator $$P_{max}(I^i)_{x,y} = \max_{0 \le a,b < s} I^i_{xs+a,ys+b} \quad (12)$$

Gradient based algorithms, including the techniques described above to account for compactness and quantization, are developed to estimate the weights in the convolutional neural network layer 300. Hence, adapting (i.e., training) the pyramid CNN (e.g., shared layer 210, the unshared network 220 or the combination thereof) includes adapting convolution filter weights for convolution filters 310. By using shared weights, the same convolution filter 310 is used for each pixel in the layer. Thus, memory size to perform convolution is reduced and computation speed is improved.

Beneficially, the face recognition system 100 using the pyramid CNN 120 with supervised learning signals achieves extraction of highly discriminative and compact representation of a face in a fast and computation-efficient manner for performing face recognition. By employing a strongly supervised pyramid CNN 120, the learning signals at all levels directly reflect the final task. Thus, the shared layers 210 learn to extract discriminative information closely related to the task.

Another interpretation of the Pyramid CNN 120 is a multi-scale feature extraction architecture. The pyramid preferably can naturally handle multi-scale input patch which is common in face recognition. The image patches of different sizes are fed to networks at corresponding scale level. The pyramid takes advantage of the multi-scale structure by using deeper networks for larger input region. The increase in depth allows higher level networks to undertake more complex and abstract computation on larger image patches.

In an alternative embodiment, more than one unshared network 220 exists in the same level, and they work on different regions while sharing their first layer parameters. Hence, the pyramid CNN 120 further includes two or more unshared networks 220 coupled to the Nth shared layer 210(N).

Certain implementations of pyramid CNNs may have some or all of the following characteristics. The input image sizes to CNN Level N typically are in the range of 80×80 to 400×400.

The pyramid CNN typically may have from 1 to 4 shared layers 210, and the downsampling is preferably in the range of 1.2 to 1.5 between layers and preferably less than 2×. The pyramid CNN may also have anywhere from 10 to 100 unshared networks 220. The box 220 in FIG. 2 represents all of these unshared networks. Typical convolution kernels may range in size from 3×3 to 7×7. There may be anywhere from 1,000 to 1 million weights per shared layer. For pyramid CNNs of these sizes, the training set typically varies in size from between 500 thousand to 10 million images. These numbers are merely representative. Designs are not required to adhere to these numbers.

Operation of Face Recognition

Figure 4:
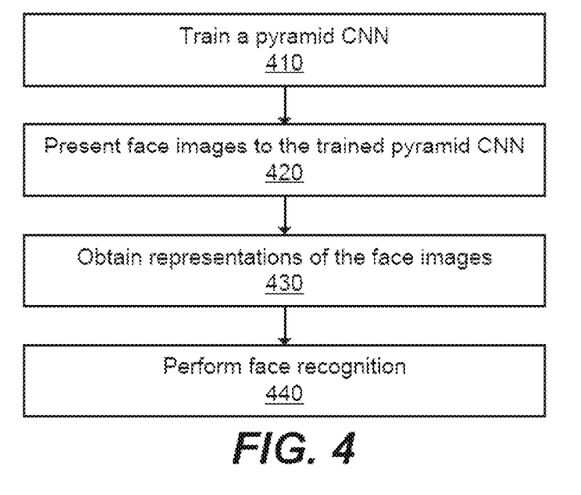
FIG. 4 is a flow diagram of a method of performing face recognition.

FIG. 4 illustrates a flow diagram of a method of performing face recognition using the face recognition system 100, according to one embodiment. The face recognition system 100 employs a pyramid CNN 120 for generating representations of face images. The pyramid CNN 120 is trained 410 with pairs of face images 110. After training is completed, target face images 110 are presented 420 to an input of the pyramid CNN 120 and compact representations of the face images 110 are obtained 430 at an output of the pyramid CNN 120. Face recognition is then performed 440 using these representations of the face images 110. For example, distances between representations can be used to determine whether two face images are for the same person.

Figure 5:
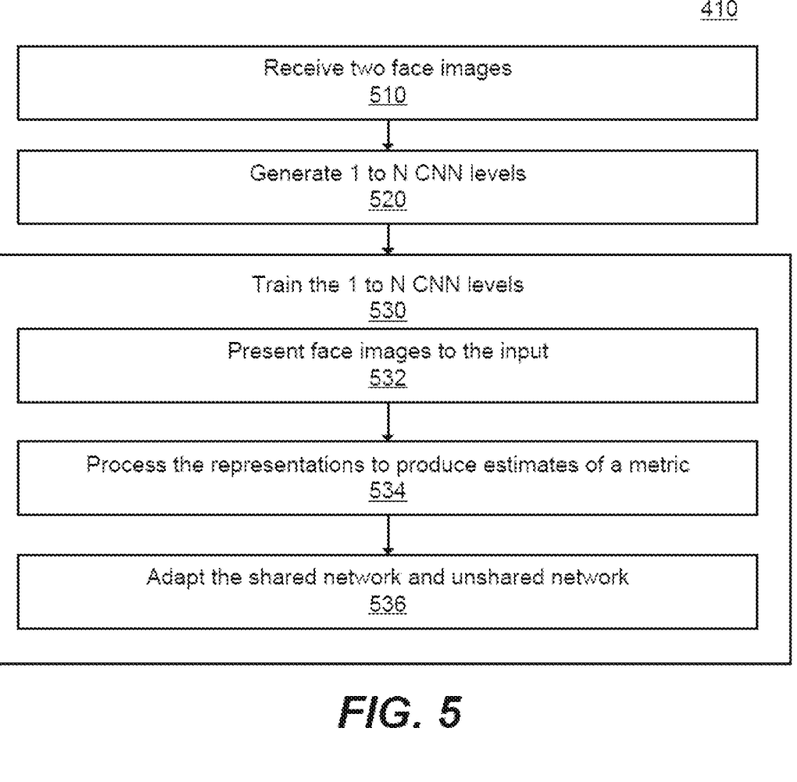
FIG. 5 is a flow diagram of a method of training the pyramid CNN.

FIG. 5 is a flow diagram of a method of training 410 the pyramid CNN 120. The pyramid CNN 120 receives 510 pairs of face images 110. The pyramid CNN 120 generates 520 1 to N CNN levels. CNN level n includes an input for receiving face images 110, the first n shared layers 210, the unshared network 220, and an output 240 for producing representations of the face images. The input is coupled to the first shared layer 210(1), and the nth shared layer 210(n) is coupled to the unshared network 220. Further, the unshared network 220 is coupled to the output 240. The CNN levels are trained 530 from level 1 to level N in that order. That is, CNN level 1 is trained first, and then CNN level 2, and so on to CNN level N.

For training CNN level n, the CNN level n is presented 532 with face images 110 to the input 230 of the CNN level n. Each face image 110 produces a corresponding representation at the output 240. In one approach, pairs of face images 110 are presented to the input 230(n) of the CNN level n. In addition, the representations are processed 534 to produce estimates of a metric 150. For example, the metric 150 is whether the two face images 110 of each pair are for the same person. The metric 150 can also be a distance between the representations of the two face images 110 in the pair. The actual values of the metric are known. Furthermore, the nth shared layer 210(n) and the unshared network 220(n) are adapted based on the estimates of the metric 150 compared to the actual values of the metric 150. Adapting the nth shared layer 210(n) and the unshared network 220(n) may be based on decreasing the distance when the two face images 110 are for the same person, and increasing the distance when the two face images are not for the same person.

Simulation Results

Labeled faces in the wild (LFW) is a challenging benchmark for face recognition systems. It contains more than 13,000 pictures acquired from the web. The experiment protocol is to evaluate the accuracy of verifying whether the two images belong to the same person. The results of face recognition using a 32 bit compact face representation are compared with results of face recognition using other methods. An outside training set is used which has little overlap with LFW. A 6 layer neural network containing 9 million parameters is used. The parameters in the neural networks are optimized by stochastic gradient descent. To accelerate training, greedy pre-training is used.

Figure 6A:
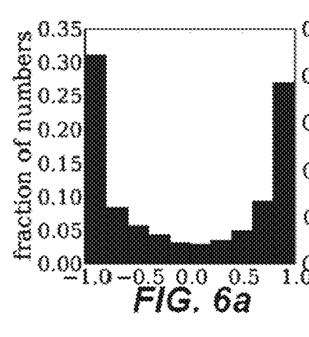
FIGS. 6a-c are histograms showing the distribution of outputs before quantization to one bit.
Figure 6B:
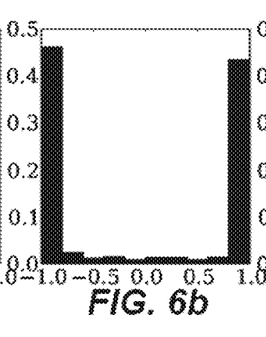
Figure 6C:
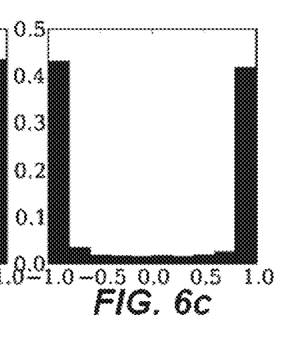

Two categories of 32-bit representations are simulated. The first category is binary representation where each bit corresponds to one binarized dimension. The three techniques described above all apply in this category. FIGS. 6a-c are histograms showing the distribution of outputs before quantization to one bit. FIG. 6a is for the rounding error term technique, FIG. 6b is for the dynamic programming technique, and FIG. 6c is for the standard deviation technique. It is observed in the experiment that all these techniques effectively encourage the activation function to saturate at the binary values of +1 and −1.

The performance of these representations is compared in Table 2. As shown in the table, the latter two techniques achieved accuracy values as high as 88.5%. As a comparison, a baseline method based on high dimensional LBP and PCA achieves an accuracy of 96% when more than 1000 dimensions are used, but its performance drastically degrades to 81.3% when the dimension is reduced to 32.

TABLE 2

Accuracy of techniques to enforce compactness.

| Length | Technique | Accuracy |
|---|---|---|
| 32 bits | Rounding error term | 87.7% |
| 32 bits | Dynamic programming | 88.4% |
| 32 bits | Standard deviation | 88.5% |

Figure 7:
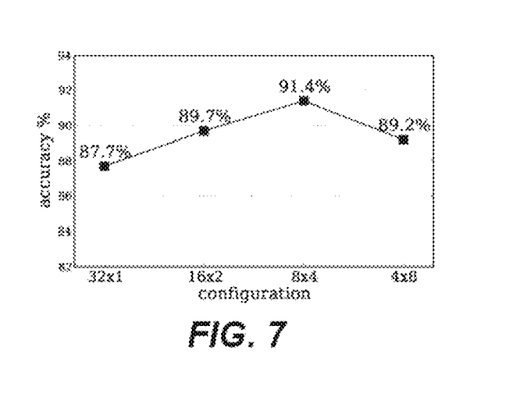
FIG. 7 plots accuracy for 32-bit face representations of different dimensions and quantization.

FIG. 7 plots accuracy for 32-bit representations, where more than one bit may be used for each dimension. The 32×1 configuration is 32 dimensions quantized to 1 bit each, the 16×2 configuration is 16 dimensions quantized to 2 bits each, and so on. The rounding error term technique is used. As shown in FIG. 7, the best result is obtained by using 4 bits for each of 8 dimensions. It achieved an accuracy of 91.4% which is greater than the performance of binary representations. This shows the benefits of the flexibility introduced by using multiple bits for one dimension. It is worth mentioning that the 32-bit representation already beats many more complicated features. The 8×4 configuration is used for the remaining experiments.

Applications to Face Search and Analysis

Figure 8:
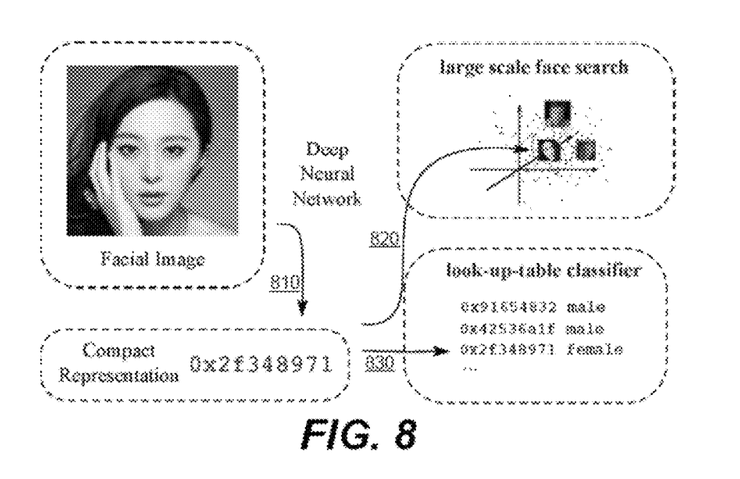
FIG. 8 illustrates uses of compact face representation.
Figure 9:
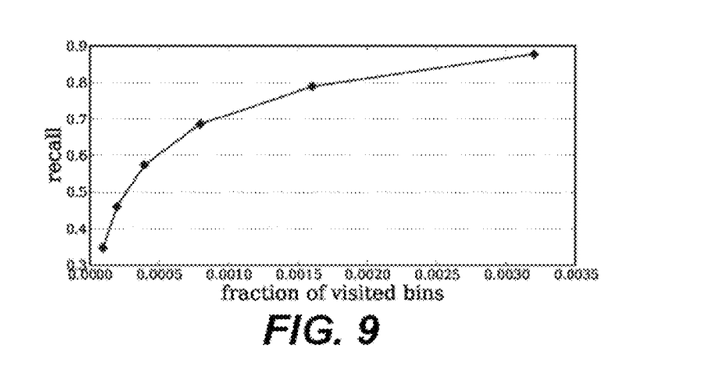
FIG. 9 plots recall rate as a function of the number of bins visited.

One application for compact face representations is to accelerate face recognition. As shown in FIG. 8, in large scale face search, the compact representation can be used to build an index for nearest neighbor searching. A received face image is converted 810 to a compact representation. Candidate face matches are generated 820 based on using the compact representation as an index. Finer-grained search and re-ranking steps follows. The 32-bit representation forms $2^{32}$ bins for the feature vectors. The bins are visited in ascending order of the distance to the query vector. To enable fair comparison, the evaluation is conducted on the LFW dataset. People with more than two pictures in the data set were selected for this experiment, and their faces were used as queries to search for matched images. The recall rate when different number of bins are visited is plotted in FIG. 9. Obviously, the recall rate increases as the number of bins considered increases. The figure shows that high recall rate can be obtained by visiting less than one thousands of the total bins, which greatly accelerates the searching.

Another application for compact face representations is learning classifiers. The usual way of building classifiers is to learn a statistical model based on the feature vectors. As the number of training samples increases, the training time becomes longer. Large scale social network normally maintains a huge image gallery from billions of people, with hundreds of millions of photos uploaded each day. Despite current effort in online learning and incremental algorithms, the learning process does not always scale well with increasing volumes.

However, if the face representation is short enough, a simple and scalable method of analysis is enabled. Referring to FIG. 8, the method is to use the face representation as an address and build a Look Up Table (LUT) 830 for the task. Due to the ID-preserving property of the compact representation, photos belonging to the same bin should share common attributes. When the number of training samples is large enough, the accuracy of the classifier approaches the Bayesian error rate. Training and classifying becomes as simple as a table look-up.

Figure 10:
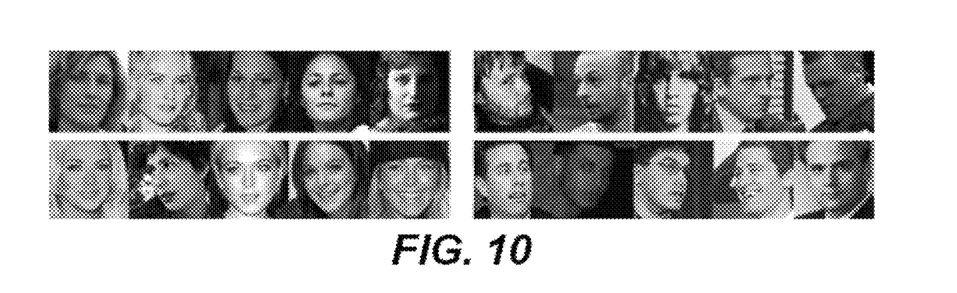
FIG. 10 shows face samples in different face representation bins.

FIG. 10 shows face samples in different face representation bins. Faces falling in the same bin (i.e., which have the same compact face representation) share a strong correlation with high-level facial attributes (e.g., gender). A prototype system was developed to demonstrate this approach. The task was to predict the gender of the person from the face image. The training set included 80,000 pictures from existing data sets, and the performance was evaluated on LFW. This achieved an accuracy of 96.8%.

Although the detailed description contains many specifics, these should not be construed as limiting the scope of the invention but merely as illustrating different examples and aspects of the invention. It should be appreciated that the scope of the invention includes other embodiments not discussed in detail above. For example, neural network architectures other than CNN could be used. As another example, other methods that simultaneously account for quantization and discrimination could be used to produce binary or quantized face representations. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In alternate embodiments, the invention is implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A computer-implemented method for training a deep learning neural network for compact face representations, the method comprising:
presenting face images to the neural network, wherein the neural network is a pyramid convolutional neural network (CNN) comprising at least N shared layers where N≥2 and at least one unshared network coupled to the Nth shared layer;
the neural network processing the face images to produce compact representations of the face images, wherein the compact representations have not more than 64 dimensions;
processing the compact representations to produce estimates of a metric, for which actual values of the metric are known; and
training the neural network based on the estimates of the metric compared to the actual values of the metric, wherein training the pyramid CNN comprises:
training CNN levels 1 to N in that order, wherein CNN level n comprises an input for receiving the face images, the first n shared layers of the pyramid CNN, the unshared network of the pyramid CNN, and an output producing the compact representations of the face images; wherein the input is coupled to a first of the n shared layers; each shared layer includes convolution, non-linearity and down-sampling; an nth of the n shared layers is coupled to the unshared network; and the unshared network is coupled to the output,
wherein training CNN level n comprises:
presenting face images to the input, each face image producing the corresponding compact representation at the output,
processing the compact representations to produce estimates of a metric, for which actual values of the metric are known, and
adapting the nth shared layer and the unshared network based on the estimates of the metric compared to the actual values of the metric.

2. The computer-implemented method of claim 1 wherein the compact representations have a predetermined number of dimensions.

3. The computer-implemented method of claim 1 wherein the compact representations are quantized.

4. The computer-implemented method of claim 3 wherein training the neural network comprises modeling quantization of the compact representations as a rounding error term.

5. The computer-implemented method of claim 3 wherein training the neural network comprises modeling quantization of the compact representations as random variables and using dynamic programming to compute an expected value based on the random variables.

6. The computer-implemented method of claim 3 wherein training the neural network comprises training the neural network based on an objective function that includes a standard deviation term.

7. The computer-implemented method of claim 3 wherein the compact representations are quantized to a single bit for each dimension of the compact representation.

8. The computer-implemented method of claim 3 wherein the compact representations are quantized to multiple bits for each dimension of the compact representation.

9. The computer-implemented method of claim 3 wherein the compact representations are quantized to different numbers of bits for different dimensions of the compact representation.

10. The computer-implemented method of claim 1 wherein the compact representations are not more than 64 bytes each.

11. The computer-implemented method of claim 10 wherein the neural network is trained subject to the compact representations having not more than 64 bytes each.

12. The computer-implemented method of claim 1 wherein:
   presenting face images to the input comprises presenting pairs of face images to the input, where it is known whether the two faces images in each pair are for a same person;
   the metric is whether the two face images of each pair are for a same person; and
   adapting comprises adapting the nth shared layer and the unshared network based on the estimated metric of whether two face images of each pair are for a same person compared to the known value of whether the two face images are actually for the same person, and further comprises not adapting the first (n−1) shared layers.

13. A computer-implemented method for processing a face image, the method comprising:
   presenting a face image to the deep learning neural network trained according to the computer-implemented method of claim 1; and
   obtaining a compact representation of the face image at an output of the deep learning neural network.

14. The computer-implemented method of claim 13 further comprising:
   using the compact representation of the face image to perform face recognition.

15. The computer-implemented method of claim 14 further comprising:
   using the compact representation of the face image to prioritize a large scale face search; and
   performing further search for the face image based on the prioritization.

16. The computer-implemented method of claim 13 further comprising:
   using the compact representation of the face image to classify the face image.

17. The computer-implemented method of claim 16 wherein using the compact representation comprises:
   using the compact representation as an index into a lookup table for the classification.

18. A non-transitory computer readable medium configured to store program code, the program code comprising instructions for training a deep learning neural network for compact face representations, the instructions when executed by a processor cause the processor to execute a method comprising:
   presenting face images to the neural network, wherein the neural network is a pyramid convolutional neural network (CNN) comprising at least N shared layers where N≥2 and at least one unshared network coupled to the Nth shared layer;
   the neural network processing the face images to produce compact representations of the face images, wherein the compact representations have not more than 64 dimensions;
   processing the compact representations to produce estimates of a metric, for which actual values of the metric are known; and
   training the neural network based on the estimates of the metric compared to the actual values of the metric, wherein training the pyramid CNN comprises:
      training CNN levels 1 to N in that order, wherein CNN level n comprises an input for receiving the face images, the first n shared layers of the pyramid CNN, the unshared network of the pyramid CNN, and an output producing the compact representations of the face images; wherein the input is coupled to a first of the n shared layers; each shared layer includes convolution, non-linearity and down-sampling; an nth of the n shared layers is coupled to the unshared network; and the unshared network is coupled to the output,
   wherein training CNN level n comprises:
      presenting face images to the input, each face image producing the corresponding compact representation at the output,
      processing the compact representations to produce estimates of a metric, for which actual values of the metric are known, and
      adapting the nth shared layer and the unshared network based on the estimates of the metric compared to the actual values of the metric.

* * * * *